United States Patent
Liao

(10) Patent No.: US 10,444,932 B2
(45) Date of Patent: Oct. 15, 2019

(54) VIRTUAL SPACE POSITIONING METHOD AND APPARATUS

(71) Applicant: Institute For Information Industry, Taipei (TW)

(72) Inventor: Hsien-Cheng Liao, Taipei (TW)

(73) Assignee: Institute For Information Industry, Taipei (TW)

( * ) Notice: Subject to any disclaimer, the term of this patent is extended or adjusted under 35 U.S.C. 154(b) by 31 days.

(21) Appl. No.: 15/880,478

(22) Filed: Jan. 25, 2018

(65) Prior Publication Data

US 2019/0227693 A1    Jul. 25, 2019

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/017* (2013.01); *G06F 3/0346* (2013.01); *G06T 19/003* (2013.01)

(58) Field of Classification Search
CPC .............. G02B 27/017; G02B 27/0172; G02B 2027/0134; G02B 2027/0138;
(Continued)

(56) References Cited

U.S. PATENT DOCUMENTS 9,256,777 B2   2/2016 Chang
9,317,108 B2   4/2016 Touma et al.
(Continued)

FOREIGN PATENT DOCUMENTS

CN    106066688 A    11/2016
CN    106502400 A    3/2017
(Continued)

OTHER PUBLICATIONS

Office Action to the corresponding Taiwan Patent Application rendered by the Taiwan Intellectual Property Office (TIPO) dated Nov. 15, 2018, 13 pages (including English translation).
(Continued)

*Primary Examiner* — Nelson M Rosario
(74) *Attorney, Agent, or Firm* — Skaar Ulbrich Macari, P.A.

(57) ABSTRACT

A virtual space positioning method and apparatus are provided. The virtual space positioning method is adapted for a human machine interface (HMI) and includes the steps of: receiving a plurality of first sensed data sets from an inertial measurement unit (IMU), determining that a data feature of the first sensed data sets conforms to a first predetermined data model, receiving a plurality of second sensed data sets from the IMU, determining that a data feature of the second sensed data sets conforms to a second predetermined data model, calculating a moving direction and a moving distance according to the first sensed data sets and the second sensed data sets, defining a first coordinate system of a real space according to the moving direction and the moving distance, and creating a relationship between the first coordinate system and the second coordinate system of a virtual space corresponding to the HMI.

14 Claims, 5 Drawing Sheets

(51) Int. Cl.
*G06F 3/0346* (2013.01)
*G06T 19/00* (2011.01)

(58) Field of Classification Search
CPC .......... G02B 2027/014; G02B 27/0093; G06F 3/012; G06F 3/013; G06F 3/0304; G06F 3/017; G06T 1/20; G06T 15/20; G06T 19/006; G06T 7/70; G06T 2219/024; G06T 7/521; G06T 7/55; G06T 2207/10012; G06T 2207/10028; G06T 2207/20008; G06T 2207/30196; G09G 3/007; G09G 2340/125; G09G 2370/02; H04N 13/111; H04N 13/139; H04N 13/271; H04N 13/282; H04N 13/344; H04N 2013/0081
See application file for complete search history.

(56) References Cited

U.S. PATENT DOCUMENTS

| | | | |
|---|---|---|---|
| 9,513,700 | B2 | 12/2016 | Weising et al. |
| 2009/0033623 | A1 | 2/2009 | Lin |
| 2009/0295729 | A1 | 12/2009 | Kuo et al. |
| 2012/0206350 | A1 | 8/2012 | Figaro et al. |
| 2015/0213649 | A1* | 7/2015 | Morishita ............. G06T 19/006 345/419 |
| 2016/0125656 | A1* | 5/2016 | James ................ G06T 7/60 345/633 |
| 2017/0084084 | A1 | 3/2017 | Durham et al. |
| 2017/0123487 | A1 | 5/2017 | Hazra et al. |
| 2017/0307888 | A1* | 10/2017 | Kohler ............... G06T 19/006 |
| 2019/0058859 | A1* | 2/2019 | Price ................. G06T 7/521 |

FOREIGN PATENT DOCUMENTS

| | | |
|---|---|---|
| CN | 107376341 A | 11/2017 |
| TW | 200951762 A | 12/2009 |
| TW | 201416911 A | 5/2014 |
| TW | 201727439 A | 8/2017 |

OTHER PUBLICATIONS

Hari Prabhat Gupta, Haresh S. Chudgar, Siddhartha Mukherjee, Tanima Dutta, Kulwant Sharma, A Continuous Hand Gestures Recognition Technique for Human-Machine Interaction Using Accelerometer and Gyroscope Sensors. IEEE Sensors Journal vol. 16, No. 16, pp. 6425-6432, Aug. 15, 2016, 8 pages.

Hikaru Watanabe, Kazuya Murao, Masahiro Mochizuki, Nobuhiko Nishio, A Recognition Method for Continuous Gestures with an Accelerometer. UBICOMP/ISWC '16 Adjunct, Heidelberg, Germany, pp. 813-822, Sep. 12-16, 2016, 10 pages.

* cited by examiner

US 10,444,932 B2

VIRTUAL SPACE POSITIONING METHOD AND APPARATUS

FIELD

The present invention relates to a virtual space positioning method and apparatus. More particularly, the present invention relates to a method and an apparatus utilize sensed data sets generated by an inertial measurement unit (IMU) for positioning in a virtual space.

BACKGROUND

The technology of virtual reality (VR) is generating a simulation environment of multi-dimensional (e.g., two-dimensional or three-dimensional) virtual space by a computer, and providing users with various senses such as a visual sense in the virtual space. When the user acts, the computer carries out complicated operations to display the corresponding image information, the virtual objects, and the like in the virtual environment on a display screen and, thereby, providing the user with a sense of presence as if the user is personally on the scene.

In the VR technology, the user may interact with the virtual object in the virtual space or perform any operation via various sensors (e.g., an Inertial Measurement Unit (IMU), a laser sensor, an infrared sensor, an image sensor, or the like). Thus, the technique of positioning in the virtual space (i.e., how accurately locating the user's action for presentation in the virtual environment in the virtual environment) is very important. The current main positioning technologies in the virtual space includes optical positioning technologies, image positioning technologies, and positioning technologies adopting specific inputting equipments.

Taking the Vive as an example, which is produced by the HTC Corporation and the Valve Corporation, it adopts the Lighthouse tracing/positioning technology. Generally speaking, in the lighthouse tracing/positioning technology, a plurality of infrared laser transmitting base stations are disposed in a real space, an optical inductor on a head-mounted display (HMD) detects the light transmitted by the infrared laser transmitting base stations, and then the position of the HMD is determined according to the time when the sensed data is collected/sensed by the HMD. Taking the Oculus Rift produced by the Oculus Corporation as another example, light emitting diodes (LEDs) on the controller and the HMD worn by the user emit lights, an external camera captures images, and then the computer analyzes the images to determine the positions of the controller and HMD.

The aforesaid technologies all have disadvantages of being expensive to build, difficult to be carried, and the image-based positioning technology is easily disturbed by background light. Accordingly, there is an urgent need for a convenient and portable virtual space positioning technology and, thereby, providing development and application of the mobile VR.

SUMMARY

An objective of the present invention is to provide a virtual space positioning method and apparatus, which may be applied to a human machine interface (HMI) to locate an action position of a user.

The disclosure includes a virtual space positioning method, executed by a processor, which can comprise the following steps: (A) receiving, by the processor, a plurality of first sensed data sets from an inertial measurement unit (IMU), wherein the first sensed data sets correspond to a first position in a real space; (B) determining, by the processor, that a first data feature of the first sensed data sets conforms to a first predetermined data model; (C) receiving, by the processor, a plurality of second sensed data sets from the IMU, wherein the second sensed data sets correspond to a second position in the real space; (D) determining, by the processor, that a second data feature of the second sensed data sets conforms to a second predetermined data model; (E) calculating, by the processor, a first moving direction and a first moving distance according to the first sensed data sets and the second sensed data sets; (F) defining, by the processor, a first coordinate system of the real space according to the first moving direction and the first moving distance; and (G) creating, by the processor, a relationship between the first coordinate system and a second coordinate system of a virtual space corresponding to the HMI.

Preferably, the first coordinate system has a plurality of first coordinate axes, each of the first coordinate axes has a first maximum value, the second coordinate system has a plurality of second coordinate axes, each of the second coordinate axes has a second maximum value, and the step (G) maps, by the processor, an origin of the second coordinate system to an origin of the first coordinate system and maps the second maximum values to the first maximum values respectively.

Preferably, the virtual space positioning method further comprises the following steps: (H) receiving, by the processor, a plurality of third sensed data sets from the IMU, wherein the third sensed data sets correspond to a third position of the real space; (I) calculating, by the processor, a second moving direction and a second moving distance according to the first sensed data sets and the third sensed data sets; (J) determining, by the processor, that the third position is located within a coordinate range of the first coordinate system according to the second moving direction and the second moving distance; (K) determining, by the processor, a coordinate point of the third position in the second coordinate system according to the second moving direction, the second moving distance, and the relationship; and (L) displaying the virtual space on a display unit and displaying a virtual object at the coordinate point of the virtual space.

Preferably, the IMU is disposed on a hand of a user, and the first predetermined data model and the second predetermined data model respectively correspond to a first specific gesture and a second specific gesture of the user.

Preferably, the IMU comprises an accelerator, each of the first sensed data sets comprises a first acceleration datum, and each of the second sensed data sets comprises a second acceleration datum.

Preferably, the IMU further comprises a gyroscope and a magnetometer, each of the first sensed data sets further comprises a first angular acceleration datum and a first direction angle datum, and each of the second sensed data sets further comprises a second angular acceleration datum and a second direction angle datum.

Preferably, the step (B) determines, by the processor, whether the first data feature of the first sensed data sets conforms to the first predetermined data model via a convolutional neural network (CNN), and the step (D) determines, by the processor, whether the second data feature of the second sensed data sets conforms to the second predetermined data model via the CNN.

Preferably, the virtual space positioning method further comprises the following steps: (M) receiving, by the processor, a plurality of first training messages corresponding to the first specific gesture, wherein each of the first training messages comprises a plurality of first training sensed data sets; (N) receiving, by the processor, a plurality of second training messages corresponding to the second specific gesture, wherein each of the second training messages comprises a plurality of second training sensed data sets; (O) establishing, by the processor, the first predetermined data model via the CNN according to a data feature of each of the first training messages; and (P) establishing, by the processor, the second predetermined data model via the CNN according to a data feature of each of the second training messages.

The disclosure also includes a virtual space positioning apparatus that is adapted for an HMI and comprises a signal receiving interface and a processor, wherein the processor is electrically connected with the signal receiving interface. The signal receiving interface is configured to receive a plurality of first sensed data sets and a plurality of second sensed data sets from an IMU, wherein the first sensed data sets and the second sensed data sets correspond to a first position and a second position in a real space respectively. The processor is configured to determine that a first data feature of the first sensed data sets conforms to a first predetermined data model and determine that a second data feature of the second sensed data sets conforms to a second predetermined data model. The processor calculates a first moving direction and a first moving distance according to the first sensed data sets and the second sensed data sets, defines a first coordinate system of the real space according to the first moving direction and the first moving distance, and creates a relationship between the first coordinate system and a second coordinate system of a virtual space corresponding to the HMI.

Preferably, the first coordinate system has a plurality of first coordinate axes, each of the first coordinate axes has a first maximum value, the second coordinate system has a plurality of second coordinate axes, each of the second coordinate axes has a second maximum value, and the processor maps an origin of the second coordinate system to an origin of the first coordinate system and maps the second maximum values to the first maximum values respectively.

Preferably, the virtual space positioning apparatus further comprises a display unit which is electrically connected with the processor. The processor receives a plurality of third sensed data sets from the IMU, and the third sensed data sets correspond to a third position of the real space. The processor calculates a second moving direction and a second moving distance according to the first sensed data sets and the third sensed data sets, and the processor determines that the third position is located within a coordinate range of the first coordinate system according to the second moving direction and the second moving distance. The processor determines a coordinate point of the third position in the second coordinate system according to the second moving direction, the second moving distance, and the relationship. The display unit displays the virtual space and displays a virtual object at the coordinate point of the virtual space.

Preferably, the virtual space positioning apparatus provided by the present invention may further execute other steps that can be executed by the aforesaid virtual space positioning method.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any particular examples, embodiments, environment, applications, or implementations described in these example embodiments. Therefore, descriptions of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
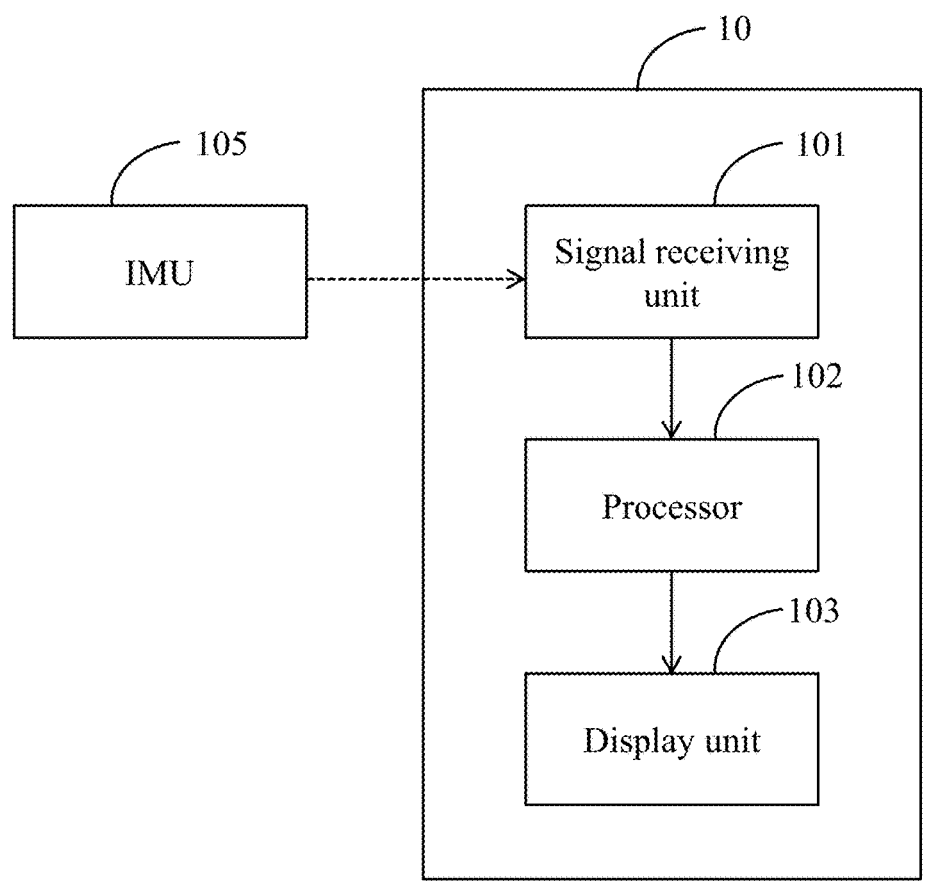
FIG. 1 is a schematic structural view of a virtual space positioning apparatus 10 of the present invention.
Figure 2:
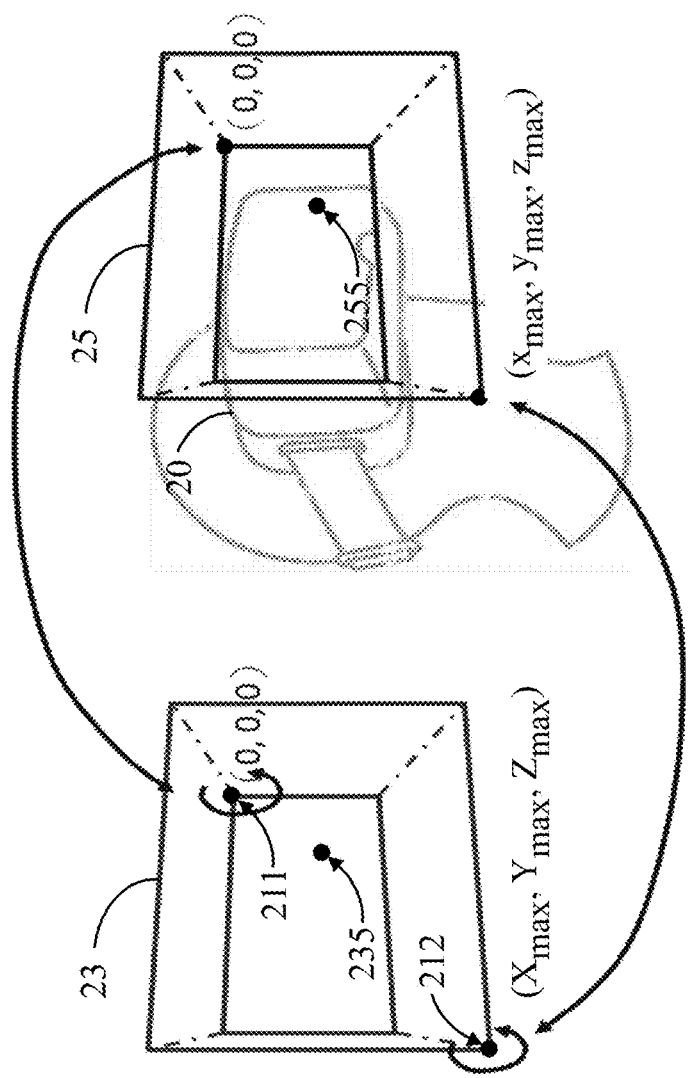
FIG. 2 is a schematic view illustrating the implementation of mapping a first coordinate system of a real space 23 to a second coordinate system of a virtual space 25 by the virtual space positioning apparatus 10.

An embodiment of the present invention is as shown in FIG. 1 and FIG. 2. FIG. 1 is a schematic structural view of a virtual space positioning apparatus 10 of the present invention, while and FIG. 2 is a schematic view of mapping a first coordinate system of a real space 23 to a second coordinate system of a virtual space 25 by the virtual space positioning apparatus 10.

As shown in FIG. 1, the virtual space positioning apparatus 10 comprises a signal receiving interface 101, a processor 102, and a display unit 103, and the virtual space positioning apparatus 10 is used with an inertial measurement unit (IMU) 105. The signal receiving interface 101 and the display unit 103 are electrically connected with the processor 102 individually. In some embodiments, the display unit 103 may be disposed detachably form the virtual space positioning apparatus 10.

The signal receiving interface 101 is a communication element (e.g., an antenna or a transmission port) that is configured to receive the sensed data sets transmitted from the IMU 105. The display unit 103 is an apparatus with the display function, e.g., a screen or a projector or the like. The IMU 105 is a sensor for detecting and measuring the acceleration and multiple degrees of freedom (DOF) motion of an object. In some embodiments, the IMU 105 comprises an accelerator such that each of the sensed data sets measured/transmitted by the IMU 105 (e.g., each of the first sensed data sets, the second sensed data sets, and the third sensed data sets in the subsequent description) may individually comprise an acceleration datum.

In some embodiments, the IMU 105 may further comprise a gyroscope and a magnetometer such that each of the sensed data sets measured/transmitted by the IMU 105 (e.g., each of the first sensed data sets, the second sensed data sets, and the third sensed data sets in the subsequent description) may further comprise an angular acceleration datum and a direction angle datum.

In this embodiment, the IMU 105 is disposed on a hand (or other parts of limbs) of a user, so the sensed data sets generated/transmitted by the IMU 105 correspond to the actions/gestures of the hand (or other parts of the limbs) of the user. For example, the IMU 105 may be configured in a wristband or a ring and worn on the hand of the user.

Please refer to FIG. 2, the virtual space positioning apparatus 10 is installed on a human machine interface (HMI) 20 in this embodiment. The HMI 20 may be implemented as a computer, intelligent glasses, an intelligent helmet, a head-mounted display, or the like. A virtual environment application program may be executed on the HMI 20, and the virtual environment application program corresponds to a virtual space 25. The display unit 103 displays the virtual space 25, and the user may control a virtual object (e.g., a cursor) in the virtual space 25 or execute operations in the virtual space 25 by operating the IMU 105 as described in detail below.

In this embodiment, the IMU 105 is disposed on a hand of a user. The signal receiving unit 101 continuously receives the sensed data sets from the IMU 105. The processor 102 determines whether a data feature of a plurality of sensed data sets conforms to a first predetermined data model. If the data feature of the plurality of sensed data sets conforms to a first predetermined data model, the processor 102 further determines whether a data feature of a plurality of other sensed data sets conforms to a second predetermined data model.

Herein, it is assumed that a plurality of first sensed data sets are received by the signal receiving unit 101, and the processor 102 determines that a first data feature of the first sensed data sets conforms to the first predetermined data model. It is assumed that a plurality of second sensed data sets are received by the signal receiving unit 101 subsequently (e.g., several seconds later), and the processor 102 determines that a second data feature of the second sensed data sets conforms to the second predetermined data model. The first sensed data sets correspond to a first position 211 of the real space 23 (i.e., when the hand of the user acts at the first position 211 of the real space 23, the IMU 105 transmits the first sensed data sets), and the second sensed data sets correspond to a second position 212 of the real space 23 (i.e., when the hand of the user acts at the second position 212 of the real space 23, the IMU 105 transmits the second sensed data sets).

The processor 102 creates a coordinate relationship between the real space 23 and the virtual space 25 according to the first sensed data sets and the second sensed data sets. Specifically, the processor 102 calculates a first moving direction and a first moving distance according to the first sensed data sets and the second sensed data sets. The first moving direction and the first moving distance represent a first relative position between the second position 212 (i.e., the position where the IMU 105 transmits the second sensed data sets) and the first position 211 (i.e., the position where the IMU 105 transmits the first sensed data sets). The processor 102 defines a first coordinate system of the real space 23 according to the first moving direction and the first moving distance (i.e., according to the first relative position). Thereafter, the processor 102 creates a relationship between the first coordinate system and a second coordinate system of the virtual space 25 corresponding to the HMI 20.

Specifically, the first coordinate system of the real space 23 has a plurality of first coordinate axes (e.g., an X axis, a Y axis, and a Z axis), and each of the first coordinate axes has a first maximum value (e.g., $X_{max}$, $Y_{max}$, and $Z_{max}$). Moreover, the second coordinate system of the virtual space 25 has a plurality of second coordinate axes (e.g., an x axis, a y axis, and a z axis), and each of the second coordinate axes has a second maximum value (e.g., $x_{max}$, $y_{max}$, and $z_{max}$). The processor 102 defines a coordinate range of the first coordinate system of the real space 23 according to the first moving direction and the first moving distance (i.e., according to the first relative position), wherein an origin (0, 0, 0) of the first coordinate system may be considered as the first position 211 where the IMU 105 transmits the first sensed data sets and the coordinate point corresponding to the first maximum values $X_{max}$, $Y_{max}$, and $Z_{max}$ of the first coordinate axes may be considered as the second position 212 where the IMU 105 transmits the second sensed data sets. By mapping the origin of the first coordinate system to the first position 211 and mapping the coordinate point corresponding to the first maximum values $X_{max}$, $Y_{max}$, and $Z_{max}$ to the second position 212, the coordinate range of the first coordinate system of the real space 23 is defined.

As described previously, the processor 102 further creates a relationship between the first coordinate system of the real time 23 and the second coordinate system of the virtual space 25. Specifically, the processor 102 maps the origin of the second coordinate system of the virtual space 25 to the origin of the first coordinate system of the real space 23, and maps the second maximum values $x_{max}$, $y_{max}$, and $z_{max}$ of the second coordinate axes to the first maximum values $X_{max}$, $Y_{max}$, and $Z_{max}$ of the first coordinate axes respectively. Moreover, the processor 102 may further create coordinate scales on the second coordinate system of the virtual space 25 according to a predetermined scale setting method, e.g., 100 evenly divided scales may be defined between the origin and each of the second coordinate axes. The scale setting methods are well known to those of ordinary skill in the art, and thus will not be further described in detail herein. Through the aforesaid operations, the virtual space positioning apparatus 10 has mapped the first coordinate system of the real space 23 to the second coordinate system of the virtual space 25, and has created the relationship between the first coordinate system of the real space 23 and the second coordinate system of the virtual space 25.

Herein, it is assumed that a plurality of third sensed data sets from the IMU 105 are received by the signal receiving unit 101 subsequently, and the processor 102 determines whether to control or display a virtual object in the virtual space 25 according to the third sensed data sets. The third sensed data sets correspond to a third position 235 of the real space 23 (i.e., when the hand of the user acts at the third position 235 of the real space 23, the IMU 105 transmits the first sensed data sets). The processor 102 calculates a second moving direction and a second moving distance according to the first sensed data sets and the third sensed data sets. The second moving direction and the second moving distance represent a second relative position between the third position 235 (i.e., the position where the IMU 105 transmits the third sensed data sets) and the first position 211 (i.e., the position where the IMU 105 transmits the first sensed data sets). The processor 102 determines whether the third position 235 is located within a coordinate range of the first coordinate system according to the second moving direction and the second moving distance. If the third position 235 is located within the coordinate range of the first coordinate system, the processor 102 determines a coordinate point 255 of the third position 235 in the second coordinate system according to the second moving direction, the second moving distance, and the relationship between the first coordinate system and the second coordinate system. Next, the display unit 103 displays a virtual object (e.g., a cursor) at the coordinate point 255 of the virtual space. In this way, a specific relationship may be created between the real space where the user actually operates the IMU 105 (e.g., through movement of the hand) and the virtual space 25, and thereby the purpose of inputting information and/or controlling/operating the virtual object on the HMI 20 is achieved.

Preferably, in some embodiments, the processor 102 could determine whether the first data feature of the first sensed data sets from the IMU 105 conforms to the first predetermined data model by the methods such as an artificial neural network (e.g., a Convolutional Neural Network (CNN)), a Support Vector Machine (SVM), a Decision Tree, or the like. Similarly, the processor 102 may determine whether the second data feature of the second sensed data sets from the IMU 105 conforms to the second predetermined data model by methods such as an artificial neural network (e.g., the CNN), an SVM, a Decision Tree, or the like.

If adopting the method such as the artificial neural network, the SVM or the Decision Tree to determine whether the first/second data feature of the first/second sensed message conforms to the first/second predetermined data model, each of the first/second data feature may be a time domain feature such as an amplitude, a slope, and/or a zero-crossing rate or the like or a frequency domain feature obtained by performing Fourier Transformation on the time domain feature. The processor 102 may obtain the first/second data feature by adopting suitable analysis technologies based on different characteristics of the acceleration datum, the angular acceleration datum, or the direction angle datum. If adopting the CNN to make the determination, the first/second data feature may be an original datum of the first/second sensed data sets. In this case, the acceleration datum, the angular acceleration datum, or the direction angle datum in the first/second sensed data sets may be integrated into a multi-dimensional vector for analysis.

In some embodiments, the IMU 105 may be disposed on a hand of a user. In these embodiments, the first predetermined data model and the second predetermined data model may respectively correspond to a first specific gesture and a second specific gesture of the user, e.g., gestures such as circling, ticking, or quoting with an upper-and-lower frame.

Preferably, in some embodiments, the signal receiving unit 105 may receive a plurality of first training messages from the IMU 105 when the user or other users do the first specific gesture, wherein each of the first training messages comprises a plurality of first training sensed data sets. The processor 102 establishes the first predetermined data model according to a data feature of each of the first training messages (e.g., establishes the first predetermined data model via the CNN). Similarly, the signal receiving unit 105 may receive a plurality of second training messages from the IMU 105 when the user or other users do the second specific gesture, wherein each of the second training messages comprises a plurality of second training sensed data sets. The processor 102 then establishes the second predetermined data model according to a data feature of each of the second training messages (e.g., establishes the second predetermined data model via the CNN). The aforesaid first specific gesture and the second specific gesture may be the same or different gestures. When the first specific gesture and the second specific gesture are the same gestures, the first predetermined data model and the second predetermined data model are the same data model.

In the embodiment shown in FIG. 2, the HMI 20 provided with the virtual space positioning apparatus 10 is a VR head-mounted apparatus. However, those of ordinary skill in the art shall appreciate that the virtual space positioning apparatus 10 may be applied to other HMIs having the virtual space as well based on the above descriptions. By the technology provided within the virtual space positioning apparatus 10, the IMU 105 may replace the inputting apparatus (e.g., a mouse) and the user may guide a virtual object (e.g., a cursor) presented on the display screen of a computer, intelligent glasses, or an intelligent helmet to move by moving the IMU 105 (e.g., taking the IMU 105 in the hand to do a gesture, moving a foot with the IMU 105 mounted on the foot).

Figure 3A:
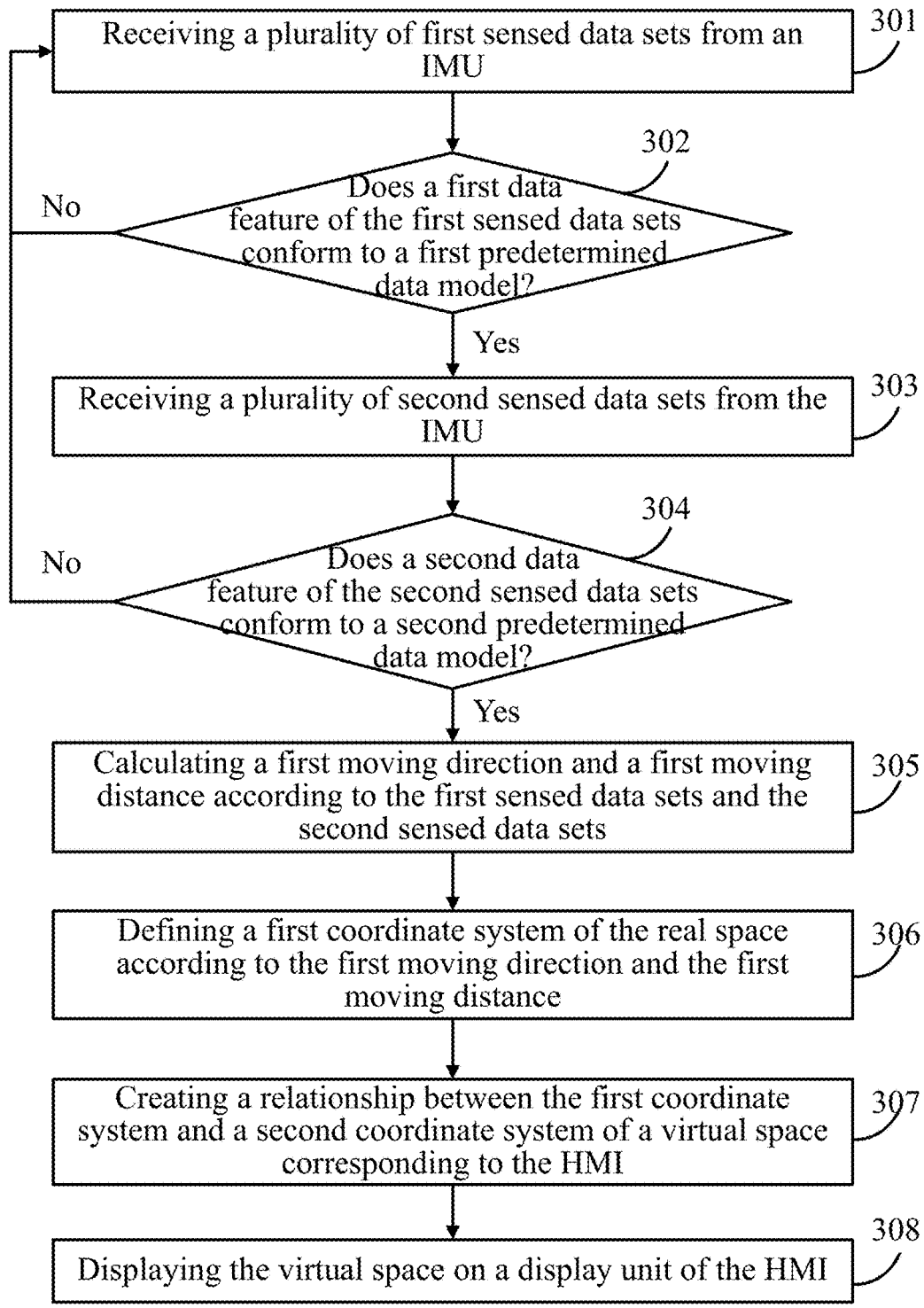
FIG. 3A is a partial schematic flowchart of a virtual space positioning method of the present invention.

Please refer to FIG. 3A, which is a schematic flowchart depicting an embodiment of a virtual space positioning method of the present invention. The virtual space positioning method is adapted for an HMI and is executed by a processor (e.g., the processor 102 in the aforesaid embodiments).

First, step 301 is executed to receive, by the processor, a plurality of first sensed data sets from an IMU, wherein the first sensed data sets correspond to a first position in a real space. Then, step 302 is executed to determine, by the processor, whether a first data feature of the first sensed data sets conforms to a first predetermined data model. In some embodiments, the step 302 determines, by the processor, that the first data feature conforms to the first predetermined data model via a CNN. If the determination result of the step 302 is No, the step 301 is executed again. If the determination result of the step 302 is Yes (i.e., the first data feature of the first sensed data sets conforms to the first predetermined data model), step 303 is executed to receive, by the processor, a plurality of second sensed data sets from the IMU, wherein the second sensed data sets correspond to a second position in the real space. Then, step 304 is executed to determine, by the processor, whether a second data feature of the second sensed data sets conforms to a second predetermined data model. In some embodiments, the step 304 determines, by the processor, that the second data feature conforms to the second predetermined data model via the CNN. If the determination result of the step 304 is No, then the step 301 is executed again.

If the determination result of the step 304 is Yes (i.e., the second data feature of the second sensed data sets conforms to the second predetermined data model), step 305 is executed to calculate, by the processor, a first moving direction and a first moving distance according to the first sensed data sets and the second sensed data sets. The first moving direction and the first moving distance represent a first relative position between the second position and the first position. Next, in step 306, a first coordinate system of the real space is defined by the processor according to the first moving direction and the first moving distance. It should be noted that the first coordinate system has a plurality of first coordinate axes, and each of the first coordinate axes has a first maximum value. The step 306 is equivalent to setting the first position where the IMU transmits the first sensed data sets as an origin of the first coordinate system, and setting the second position where the IMU transmits the second sensed data sets as a coordinate point corresponding to the first maximum values.

Thereafter, step 307 is executed to create, by the processor, a relationship between the first coordinate system and a second coordinate system of a virtual space corresponding to the HMI. Specifically, the second coordinate system has a plurality of second coordinate axes, and each of the second coordinate axes has a second maximum value. The step 307 maps, by the processor, an origin of the second coordinate system to an origin of the first coordinate system and maps the second maximum values to the first maximum values respectively. In some embodiments, step 308 may be further executed to display the virtual space on a display unit of the HMI.

Figure 3B:
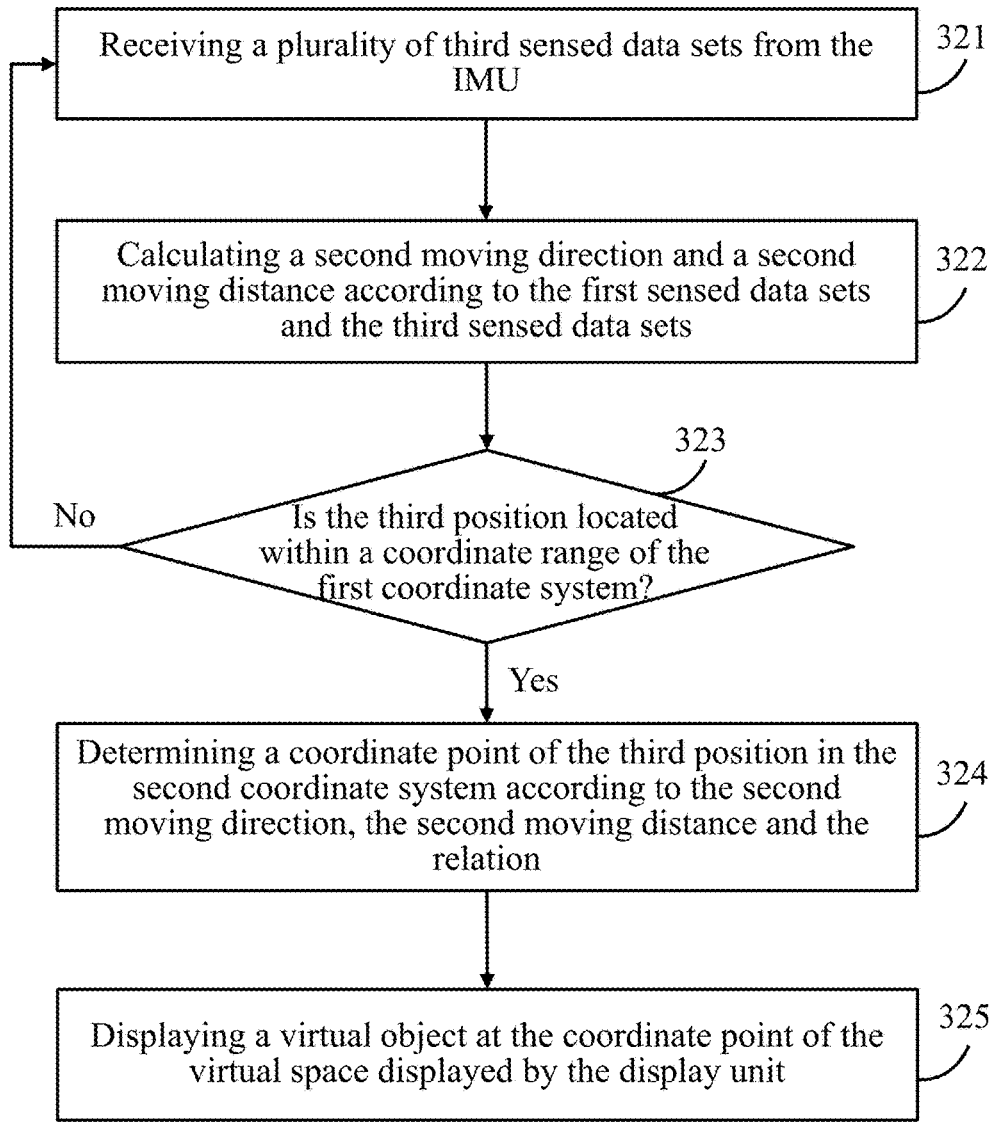
FIG. 3B is a partial schematic flowchart of a virtual space positioning method of the present invention.

In some embodiments, the procedure shown in FIG. 3B is further executed. In step 321, a plurality of third sensed data sets are received by the processor from the IMU, wherein the third sensed data sets correspond to a third position of the real space. In step 322, a second moving direction and a second moving distance are calculated by the processor according to the first sensed data sets and the third sensed data sets. The second moving direction and the second moving distance present a second relative position between the third position and the first position. In step 323, the processor determines whether the third position is located within a coordinate range of the first coordinate system according to the second moving direction and the second moving distance. If the determination result of the step 323 is No, the method returns to the step 321. If the determination result of the step 323 is Yes, step 324 is executed to determine, by the processor, a coordinate point of the third position in the second coordinate system according to the second moving direction, the second moving distance, and the relationship. In step 325, a virtual object is displayed at the coordinate point of the virtual space displayed by the display unit.

In some embodiments, the IMU is disposed on a hand of a user, and the first predetermined data model and the second predetermined data model correspond respectively to a first specific gesture and a second specific gesture of the user.

In some embodiments, the IMU comprises an accelerator, each of the first sensed data sets comprises a first acceleration datum, and each of the second sensed data sets comprises a second acceleration datum. In some embodiments, the IMU further comprises a gyroscope and a magnetometer, each of the first sensed data sets further comprises a first angular acceleration datum and a first direction angle datum, and each of the second sensed data sets further comprises a second angular acceleration datum and a second direction angle datum.

Preferably, a training process may be executed before the step 302 to establish the first and the second predetermined data models. For example, when one or more users take the IMU in the hand and do the first specific gesture (e.g., a ticking gesture with the hand moving downward first and then moving upward), the training process executes a step of receiving, by the processor, a plurality of first training messages from the IMU, wherein each of the first training messages corresponds to the first specific gesture and comprises a plurality of first training sensed data sets. The training process further executes another step of establishing, by the processor, the first predetermined data model according to a data feature of each of the first training messages (e.g., via a convolutional neural network).

Similarly, when one or more users wear the device with IMU in the hand and do the second specific gesture, the training process executes a step to receive, by the processor, a plurality of second training messages from the IMU, wherein each of the second training messages corresponds to the second specific gesture and comprises a plurality of second training sensed data sets. The training process further executes another step of establishing, by the processor, the second predetermined data model according to a data feature of each of the second training messages (e.g., via a convolutional neural network).

In addition to the aforesaid steps, the virtual space positioning method of this embodiment can also execute all the operations and functions set forth in the aforesaid embodiments. How this embodiment executes these operations and functions will be readily appreciated by those of ordinary skill in the art based on the explanation of the aforesaid embodiments, and thus will not be further described herein.

Figure 4:
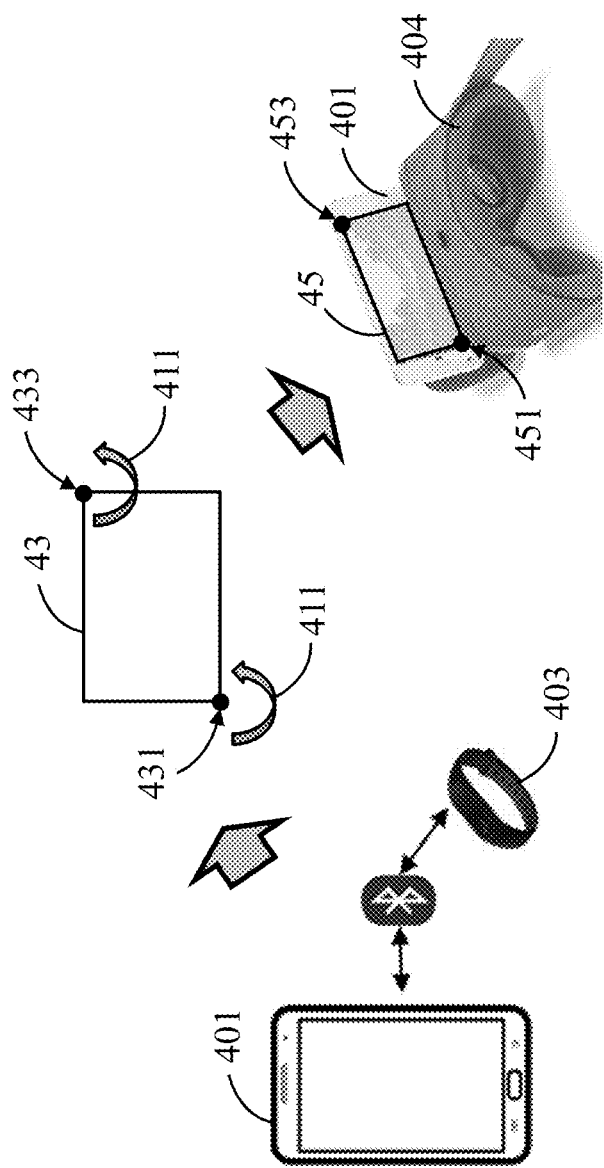
FIG. 4 is a schematic view of an embodiment in which the virtual space positioning apparatus of the present invention is applied in a virtual reality apparatus.

Please refer to FIG. 4, which is a schematic view of an embodiment in which the virtual space positioning apparatus of the present invention is applied in a virtual reality apparatus. In FIG. 4, a smart phone 401 connects with a smart wristband 403 via a Bluetooth protocol. The smart wristband 403 is provided with an IMU (not labeled). An application (APP) on the smart phone 401 may receive, after being activated, the sensed data sets transmitted from the IMU on the smart wristband 403. By the labeling function of the application, a start point and an end point of each of the sensed data sets received when the user does a specific gesture (e.g., circling or ticking or the like) may be labeled. Thereafter, a predetermined data model corresponding to the specific gesture may be established by performing model training on the sensed data sets being collected via a machine learning method (e.g., the CNN).

Thereafter, the virtual reality function of the application on the smart phone 401 is activated, and then the smart phone 401 is placed into a mobile head-mounted apparatus 404. The smart phone 401 continuously receives the sensed data sets from the IMU of the smart wristband 403, and determines whether some data features of the sensed data sets being received conform to a predetermined data model that has been trained. When the smart phone 401 determines that some data features of the sensed data sets conform to the predetermined data model, it means that the user has done a specific gesture 411 at a certain position (which is assumed to be the first position 431). The smart phone 401 continuously receives the sensed data sets from the IMU of the smart wristband 403, and determines whether the data feature of a plurality of other sensed data sets conforms to a predetermined data model that has been trained. When the smart phone 401 determines that the data feature of the other sensed data sets conforms to the predetermined data model that has been trained, it means that the user has done the specific gesture at another position (which is assumed to be the second position 433).

The smart phone 401 sets the first position 431 to be the origin of the first coordinate system of the real space 43 according to the virtual space positioning technology provided in the present invention, and sets the second position 433 to be a maximum distance point of the first coordinate system of the real space 43. It should be noted that the first coordinate system has a plurality of first coordinate axes, each of the first coordinate axes has a first maximum value, and each of the coordinate points corresponding to the first maximum values is the aforesaid maximum distance point. The smart phone 401 maps the origin (i.e., the first position 431) and the maximum distance point (i.e., the second position 433) of the first coordinate system to the origin 451 and the maximum distance point 453 of the second coordinate system of the virtual space 45 of the virtual reality. It should be noted that the second coordinate system has a plurality of second coordinate axes, each of the second coordinate axes has a second maximum value, and each of the coordinate points corresponding to the second maximum values is the aforesaid maximum distance point in the second coordinate system. Taking a two-dimensional coordinate system as an example, the maximum distance point may be represented as ($X_{max}$, $Y_{max}$). Taking a three-dimensional coordinate system as an example, the maximum distance point may be represented as ($X_{max}$, $Y_{max}$, $Z_{max}$).

Thereafter, the smart phone 401 continuously receives the sensed data sets transmitted from the IMU of the smart wristband 403, calculates a relative position (including the direction and the displacement) of the smart wristband 403 relative to the first position 431 by performing integration for two times on the acceleration data of all directions comprised in the sensed data sets, and calculates a corresponding coordinate point of the relative position in the virtual space 45 according to the relationship between the first coordinate system and the second coordinate system, and displays a virtual object in the virtual space 45 of the virtual reality according to the coordinate point. Other details of the implementation are as shown in FIG. 2, and thus will not be further described herein.

According to the above descriptions, when using the virtual space positioning apparatus and method of the present invention, there is no need to install an external detecting apparatus in advance and no need to perform positioning by image data. Therefore, the present invention is not affected by the ambient light condition, and is applicable in any space and environment. As compared to the prior art, the present invention is provided with a high flexibility and environmental adaptability to effectively solve the problems and improve the drawbacks of the prior art. Moreover, the present invention may be implemented in combination with currently existing apparatuses (e.g., smart wristbands and smart phones), and thus is provided with an economical efficiency and an industrial applicability.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A virtual space positioning method adapted for a human machine interface (HMI), the virtual space positioning method being executed by a processor and comprising:
   (A) receiving, by the processor, a plurality of first sensed data sets from an inertial measurement unit (IMU), wherein the first sensed data sets correspond to a first position in a real space;
   (B) determining, by the processor, that a first data feature of the first sensed data sets conforms to a first predetermined data model;
   (C) receiving, by the processor, a plurality of second sensed data sets from the IMU, wherein the second sensed data sets correspond to a second position in the real space;
   (D) determining, by the processor, that a second data feature of the second sensed data sets conforms to a second predetermined data model;
   (E) calculating, by the processor, a first moving direction and a first moving distance according to the first sensed data sets and the second sensed data sets;
   (F) defining, by the processor, a first coordinate system of the real space according to the first moving direction and the first moving distance; and
   (G) creating, by the processor, a relationship between the first coordinate system and a second coordinate system of a virtual space corresponding to the HMI,
   wherein the first coordinate system has a plurality of first coordinate axes, each of the first coordinate axes has a first maximum value, the second coordinate system has a plurality of second coordinate axes, each of the second coordinate axes has a second maximum value, and the step (G) creates the relationship by mapping an origin of the second coordinate system to an origin of the first coordinate system and mapping the second maximum values to the first maximum values respectively.

2. The virtual space positioning method of claim 1, further comprising:
   receiving, by the processor, a plurality of third sensed data sets from the IMU, wherein the third sensed data sets correspond to a third position of the real space;
   calculating, by the processor, a second moving direction and a second moving distance according to the first sensed data sets and the third sensed data sets;
   determining, by the processor, that the third position is located within a coordinate range of the first coordinate system according to the second moving direction and the second moving distance;
   determining, by the processor, a coordinate point of the third position in the second coordinate system according to the second moving direction, the second moving distance, and the relationship; and
   displaying the virtual space on a display unit and displaying a virtual object at the coordinate point of the virtual space.

3. The virtual space positioning method of claim 1, wherein the IMU is disposed on a hand of a user, and the first predetermined data model and the second predetermined data model respectively correspond to a first specific gesture and a second specific gesture of the user.

4. The virtual space positioning method of claim 1, wherein the IMU comprises an accelerator, each of the first sensed data sets comprises a first acceleration datum, and each of the second sensed data sets comprises a second acceleration datum.

5. The virtual space positioning method of claim 4, wherein the IMU further comprises a gyroscope and a magnetometer, each of the first sensed data sets further comprises a first angular acceleration datum and a first direction angle datum, and each of the second sensed data sets further comprises a second angular acceleration datum and a second direction angle datum.

6. The virtual space positioning method of claim 1, wherein the step (B) determines, by the processor, that the first data feature conforms to the first predetermined data model via a convolutional neural network (CNN), and the step (D) determines, by the processor, that the second data feature conforms to the second predetermined data model via the CNN.

7. The virtual space positioning method of claim 3, further comprising:
   receiving, by the processor, a plurality of first training messages corresponding to the first specific gesture, wherein each of the first training messages comprises a plurality of first training sensed data sets;
   receiving, by the processor, a plurality of second training messages corresponding to the second specific gesture, wherein each of the second training messages comprises a plurality of second training sensed data sets;

establishing, by the processor, the first predetermined data model via a convolutional neural network (CNN) according to a data feature of each of the first training messages; and establishing, by the processor, the second predetermined data model via the CNN according to a data feature of each of the second training messages.

8. A virtual space positioning apparatus adapted for a human machine interface (HMI), comprising:

a signal receiving interface, being configured to receive a plurality of first sensed data sets and a plurality of second sensed data sets from an inertial measurement unit (IMU), wherein the first sensed data sets and the second sensed data sets correspond to a first position and a second position in a real space respectively; and a processor electrically connected with the signal receiving interface, being configured to determine that a first data feature of the first sensed data sets conforms to a first predetermined data model, determine that a second data feature of the second sensed data sets conforms to a second predetermined data model, calculate a first moving direction and a first moving distance according to the first sensed data sets and the second sensed data sets, define a first coordinate system of the real space according to the first moving direction and the first moving distance, and create a relationship between the first coordinate system and a second coordinate system of a virtual space corresponding to the HMI, wherein the first coordinate system has a plurality of first coordinate axes, each of the first coordinate axes has a first maximum value, the second coordinate system has a plurality of second coordinate axes, each of the second coordinate axes has a second maximum value, and the processor creates the relationship by mapping an origin of the second coordinate system to an origin of the first coordinate system and mapping the second maximum values to the first maximum values respectively.

9. The virtual space positioning apparatus of claim 8, further comprising:

a display unit electrically connected with the processor and being configured to display the virtual space, wherein the signal receiving interface receives a plurality of third sensed data sets from the IMU, the third sensed data sets corresponding to a third position of the real space, the processor calculates a second moving direction and a second moving distance according to the first sensed data sets and the third sensed data sets, the processor determines that the third position is located within a coordinate range of the first coordinate system according to the second moving direction and the second moving distance, the processor determines a coordinate point of the third position in the second coordinate system according to the second moving direction, the second moving distance, and the relationship, and the display unit displays a virtual object at the coordinate point of the virtual space.

10. The virtual space positioning apparatus of claim 8, wherein the IMU is disposed on a hand of a user, and the first predetermined data model and the second predetermined data model respectively correspond to a first specific gesture and a second specific gesture of the user.

11. The virtual space positioning apparatus of claim 8, wherein the IMU comprises an accelerator, each of the first sensed data sets comprises a first acceleration datum, and each of the second sensed data sets comprises a second acceleration datum.

12. The virtual space positioning apparatus of claim 11, wherein the IMU further comprises a gyroscope and a magnetometer, each of the first sensed data sets further comprises a first angular acceleration datum and a first direction angle datum, and each of the second sensed data sets further comprises a second angular acceleration datum and a second direction angle datum.

13. The virtual space positioning apparatus of claim 8, wherein the processor determines that the first data feature conforms to the first predetermined data model via a convolutional neural network (CNN) and determines that the second data feature conforms to the second predetermined data model via the CNN.

14. The virtual space positioning apparatus of claim 10, wherein the signal receiving interface further receives a plurality of first training messages corresponding to the first specific gesture and a plurality of second training messages corresponding to the second specific gesture, each of the first training messages comprising a plurality of first training sensed data sets, each of the second training messages comprising a plurality of second training sensed data sets, the processor further establishes the first predetermined data model via a convolutional neural network (CNN) according to a data feature of each of the first training messages, and the processor further establishes the second predetermined data model via the CNN according to a data feature of each of the second training messages.

* * * * *